Patented June 30, 1942

2,288,533

UNITED STATES PATENT OFFICE 2,288,533

PROCESS FOR THE PRODUCTION OF ARTIFICIAL RESINS

Ignaz Kreidl, London, England, and Franz Nozicka, Vienna, Germany, assignors to Fridolin Glass, trading under the style Vereinigte Chemische Fabriken Kreidl, Heller & Co. Nfg., Vienna, Germany No Drawing. Application April 17, 1939, Serial No. 268,404. In Austria April 26, 1938

5 Claims. (Cl. 260—57)

This invention relates to artificial resins produced from phenols or cresols and aldehydes, preferably formaldehyde, especially from phenol and formaldehyde or cresol and formaldehyde. In the production of the known artificial resins from phenols and aldehydes either acid condensation is employed mostly with a mol-ratio between phenol and formaldehyde of 1:1, or alkaline condensation is employed mostly with a mol-ratio between phenol and formaldehyde of 1:1 to 1:2. In the case of acid condensation artificial resins are obtained which are themselves not hardenable but can be converted into products with good mechanical and thermic properties by treatment with hexamethylene-tetramine. These artificial hardenable compositions obtained in this manner are today in general use as so-called quick pressing compositions. Acid condensation is, however, open to the objection that the artificial compositions are relatively bad electric insulators and the presence of hexamethylene-tetramine has the objectionable effect that the artificial resin is difficult to color, obviously owing to the detrimental effect the hexamethylene-tetramine causes on coloring matters as regards the coloring strength and the color. In the case of alkaline condensation hardenable condensation products are obtained, but these resins have a hardening speed which is much behind the hardening speed of the above mentioned quick pressing compositions. The hardening speed can certainly be increased by the addition of metal oxides, but it is never possible by such additions to attain hardening speeds which are equal to or anywhere near the hardening speeds of the condensation products obtained by acid condensation and treated with hexamethylene-tetramine. These products also have a lower mechanical strength and thermic resistance. The alkaline condensation, however, has the advantageous effect of producing products which color well.

The invention has for its object, to produce products which possess both the good properties of the products obtained by acid condensation, that is particularly the hardening speed and the rapid hardening (for example in the press) and good mechanical and thermic properties, and also the good properties of the products obtained by alkaline condensation, that is good coloring capability and also high insulating property.

The process according to the invention is based on the discovery that the hardening properties of the condensation products obtained by alkaline condensation and subjected to alkaline final hardening can be improved by a subsequent addition of acid or compounds giving off acid or salts exerting an acid effect including salts of ammonia and the like; the more acid or salt is added, the greater the hardening speed becomes. The addition of acid or salt may be effected at any desired stage after the condensation, that is even directly before the resite formation.

The invention therefore relates to an artificial resin from a condensation product obtained by alkaline condensation from phenols with aldehydes, with an addition of acids, compounds giving off acids, acid-acting salts, including salts of ammonia, the final hardening being alkaline.

The process according to the invention can be carried out both with inorganic acids and salts and also with organic acids and salts, but, as the more acid or salt is used the greater will become the hardening speed, limits are set for the addition. The addition of acid or salt is therefore limited by the hardening speed itself, because for press-technical reasons the hardening speed must not exceed a certain speed, but the most advantageous quantity to be added can be easily ascertained by the empirical method for every acid and for every salt. The stronger the acid is, the smaller will be the quantity which is added. The invention therefore offers a simple means for adjusting as desired the hardening speed of such artificial resins. At the same time the addition of mixtures of strong and weak acids or of such salts, for example of mixtures of organic and inorganic acids, offers a means for correspondingly regulating the action on the resin or of weakening the effect of a strong acid or of strengthening that of a weak acid.

The invention is also based on the discovery, that resins and resin compositions with particularly good properties are obtained, when the condensation product obtained by alkaline condensation is, after neutralization of the alkali, treated with ammonia and only then acid or salt is added to the resin thus treated. By the addition of ammonia after the neutralization the effect is attained, that the condensation product can be dehydrated to a considerable extent, for example by vacuum distillation, which was hitherto not possible without considerably changing, that is increasing the degree of polymerisation of the resins, or resins were produced which, at the resite formation, give off less water than those which were not treated with ammonia.

In carrying out the process a certain quantity of ammonia is added to the product of condensation obtained by alkaline condensation, after the neutralization of the alkali, this quantity being at the most a quantity which is completely taken up in the resin and no relatively large quantity of free ammonia is left in the resin. A large quantity of free ammonia in the resin detrimentally affects the dehydrating capability of the resin, for example in the case of vacuum distillation.

The artificial compositions obtained by alkaline condensation and subsequent treatment with ammonia possess the advantageous properties of the alkaline condensed artificial resins to an increased extent even as regards hardening.

If such alkaline condensed artificial resins and artificial resins treated with ammonia are treated with acid or salt, it is advisable to keep the ammonia and acid in a predetermined ratio. Thus, for example particularly when using lactic acid as acid addition for increasing the hardening speed, a ratio of 1 mol lactic acid to 1 mol ammonia has been found advisable. The most favorable mol proportion can evidently be empirically determined for every acid by simple experiment and is also dependent upon the quantity of the alkaline additions used for the final hardening.

Less acid may be used in the case of acids stronger than lactic acid, while more acid is used in the case of acids weaker than lactic acid.

Such alkaline condensed resins according to the invention with an acid or salt addition in any stage of the treatment before the resite formation produce resins with any desired hardening speed and with excellent mechanical properties, if alkaline acting substances are added such as metal oxides, hydroxides, carbonates or the like; preferably multivalent oxides or hydroxides, but suitably also carbonate of ammonia. The addition of oxide or hydroxide mixtures is particularly favorable. By the addition of such metal oxides, for example, magnesium oxide, zinc oxide, barium oxide and so forth, or of such hydroxides or of such mixtures, preferably in combination with carbonate or bicarbonate of ammonia, the hardening speed is influenced in a favorable manner, the hardening speed becoming the greater the larger the quantity of oxide or the like addition is. Thus, it is possible to add at the same time to the quantity of resin for example about ½ to 2% magnesium oxide and 1 to 2% zinc oxide, but preferably also 0.2 to 2% of carbonate of ammonia. It is preferable, to use acid and oxide at the same time in the form of oxides and salts, especially basic salts such as oxychlorides for all purposes.

The addition of the metal oxides or hydroxides or the like may be made in any stage of the preparation of the artificial resin, either at the same time as the acid or the salt or at some other time, at the latest before the resite formation.

The artificial resins thus obtained may be used alone or in conjunction with filling materials as molding compositions or plastic substances, compositions for casting, pure resin materials for pressing (high grade artificial resin), spraying substances, varnishes and so forth. These artificial substances, may, however, be used in conjunction with so-called slipping substances, or with an addition of slipping substances, as for example with an addition of stearates and waxes and the like, combinations of stearates and waxes being particularly advantageous.

In carrying out the process the alkaline condensation is preferably carried through at a mol proportion between phenol and formaldehyde of 1:1.5 to 1:2, this condensation being preferably carried out in the presence of sulphur, preferably of substances containing sulphur in S—S combination, if desired with the cooperation of catalysts assisting in the sulphurisation, as described in the Austrian Patent No. 147,810.

*Examples*

1. 80 kilogrammes of phenol are dissolved in 140 kilogrammes 40% formaldehyde, then 3.4 kilogrammes of barium hydroxide are added and the mixture boiled under reflux. Neutralization with sulphuric acid then follows, and 6 kilogrammes of 20% ammonia solution are added and distilled in the vacuum.

Hereupon, about 50 kilogrammes of saw dust are mixed with 2 kilogrammes of magnesium oxide, 2 kilogrammes zinc oxide and 0.5 kilogram of carbonate of ammonia and 2 kilogrammes of 80% lactic acid distributed in the mixture and coloring matter and slipping substance are added. The saw dust thus prepared is kneaded with about 50 kilogrammes of resin and worked to a quick pressing composition on a calender in the usual manner.

2. The procedure is the same as in Example 1, with the difference that 8 kilogrammes of lactic acid are also added after the ammonia addition. During the production of the pressing mixture no lactic acid is added, the other additions remaining in similar quantitative proportions.

3. 80 kilogrammes of meta-para-cresol are dissolved in 58 kilogrammes of 40% formaldehyde, a solution of barium-polysulphide ($BaS_4$) corresponding to 3 kilogrammes of polysulphide sulphur is added, whereupon the solution is boiled and an additional 62 kilogrammes of formaldehyde are added and the solution is heated to temperatures below the boiling point. The solution is then neutralized with sulphuric acid and, after addition of 4 kilogrammes of 80% lactic acid, the water is distilled off under vacuum.

A molding mixture is then made, containing 2% magnesium oxide, 0.5% zinc oxide and 1.8% carbonate of ammonia besides the usual sliding substances and colouring matters.

4. 80 kilogrammes of phenol are dissolved in 100 kilogrammes of 40% formaldehyde and 2.5 kilogrammes of barium hydroxide are added and the solution is boiled. The condensate is neutralized, 8 kilogrammes of 20% ammonia solution are added, and the water is distilled off under vacuum.

A quick pressing composition is produced from the resin and a hardening agent is added to it, consisting for example of 3.5% of a mixture of 20 parts of magnesium oxide, 10 parts of zinc oxide and 5 parts of zinc chloride. Ammonium chloride may be used instead of zinc chloride.

5. 80 kilogrammes of phenol are dissolved in 140 kilogrammes 40% formaldehyde, 3.4 kilogrammes of barium hydroxide are added and the solution is boiled under re-flux. The solution is then neutralized with sulphuric acid and a portion of the water distilled off under vacuum.

A mixture of 1.4 kilogrammes of zinc chloride and 1.6 kilogrammes of zinc oxide are now stirred to a paste with water, added to the solution which is then distilled.

A resin is then produced which can be worked up into a composition for casting in the usual manner.

6. 80 kilogrammes of phenol are dissolved in 100 kilogrammes of 40% formaldehyde and a solution of 1.2 kilogrammes sodium polysulphide ($Na_2S_4$) is added and the solution boiled. After neutralisation with hydrochloric acid, 4 kilogrammes of 20% ammonia solution and 0.5 kilogramme of zinc chloride are added and the water is distilled off under vacuum until a clear resin is produced. This is dissolved in alcohol, mixed with the usual softeners and can be used as varnish or for producing film or laminated materials.

We claim:

1. A process for the production of artificial resins from phenols and formaldehyde, which comprises condensing a phenol with an aldehyde in the presence of an alkaline condensing agent until a resin is formed, neutralizing the alkali in the resulting condensation product, treating the neutralized product with ammonia, the maximum quantity of ammonia added being such that the total quantity of ammonia is reacted in the resin and that practically no free ammonia remains in the resin, adding to the condensation product thus treated at least one acidifying substance in such a quantity that the resin becomes acid, and hardening the said resin in an alkaline medium.

2. A process as claimed in claim 1 in which the acidifying substance is an acid.

3. A process as claimed in claim 1 in which the acidifying substance is a salt capable of releasing acid.

4. A process as claimed in claim 1 in which the acidifying substance is a salt of ammonia.

5. A process for the production of artificial resins from phenols and formaldehyde, which comprises condensing a phenol with an aldehyde in the presence of an alkaline condensing agent until a resin is formed, neutralizing the alkali in the resulting condensation product, treating the neutralized product with ammonia, the maximum quantity of ammonia added being such that the total quantity of ammonia is reacted in the resin and that practically no free ammonia remains in the resin, adding to the condensation product thus treated at least one acidifying substance in such a quantity that the resin becomes acid, and adding to the resin zinc oxide in a quantity sufficient to neutralize the acid to harden the resin.

IGNAZ KREIDL.
FRANZ NOZICKA.